United States Patent
Nagarajegowda et al.

(10) Patent No.: US 11,461,182 B2
(45) Date of Patent: Oct. 4, 2022

(54) STORAGE SYSTEM BACKUP AND DE-DUPLICATION

(71) Applicant: EMC IP Holding Company LLC, Hopkinton, MA (US)

(72) Inventors: Deepak Nagarajegowda, Cary, NC (US); Sathish Bikumala, Round Rock, TX (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 115 days.

(21) Appl. No.: 17/119,627

(22) Filed: Dec. 11, 2020

(65) Prior Publication Data

US 2022/0188198 A1 Jun. 16, 2022

(51) Int. Cl.
| | |
|---|---|
| *G06F 16/00* | (2019.01) |
| *G06F 11/14* | (2006.01) |
| *G06F 16/11* | (2019.01) |
| *G06F 16/13* | (2019.01) |
| *G06F 40/40* | (2020.01) |
| *G06F 16/174* | (2019.01) |
| *G06Q 10/10* | (2012.01) |

(52) U.S. Cl.
CPC ........ *G06F 11/1453* (2013.01); *G06F 16/116* (2019.01); *G06F 16/137* (2019.01); *G06F 16/1748* (2019.01); *G06F 40/40* (2020.01); *G06F 2201/84* (2013.01); *G06Q 10/10* (2013.01)

(58) Field of Classification Search
CPC .. G06F 11/1453; G06F 16/116; G06F 16/137; G06F 16/1748; G06F 40/40; G06F 2201/84; G06Q 10/10
See application file for complete search history.

(56) References Cited

U.S. PATENT DOCUMENTS

2018/0181808 A1* 6/2018 Sridharan ............ G06K 9/6269

* cited by examiner

*Primary Examiner* — Tyler J Torgrimson
(74) *Attorney, Agent, or Firm* — Amin, Turocy & Watson, LLP

(57) ABSTRACT

Techniques are provided for storage system backup and de-duplication. In an example, a file system stores a plurality of files. These files can be grouped into smaller sets through a series of iterations, where a set of files is similar to each other. Then, files of a set of files can be directly compared for duplicate information relative to each other, one copy of this duplicate information can be stored, and other copies can be discarded.

20 Claims, 14 Drawing Sheets

500

ELEMENT
504a

ELEMENT
504b

| 3 | 1 | 1 | 1 | 0 | 0 | 1 | 1 | 2 | 2 |

| FILE | SHINGLE | | | |
|---|---|---|---|---|
| | abc | ... | ... | xyz |
| 1 | 1 | 0 | 0 | 0 |
| 2 | 0 | 1 | 1 | 0 |
| ... | 0 | 1 | 0 | 1 |
| N | 1 | 1 | 0 | 0 |

COLUMNS 904

ROWS 902

| FILE | COLUMNS 1004 | | |
|---|---|---|---|
| 1 | 2 | 1 | 1 |
| 2 | 3 | 2 | 1 |
| ... | 1 | 2 | 1 |
| N | 1 | 2 | 2 |

ROWS 1002

ROWS
1202

COLUMNS
1204

| FILE | SEGMENT 1 | SEGMENT 2 | SEGMENT 3 | SEGMENT 4 | SEGMENT 5 | SEGMENT 6 | SEGMENT 7 | SEGMENT 8 | SEGMENT 9 |
|---|---|---|---|---|---|---|---|---|---|
| 1 | 1 | 0 | 1 | 1 | 0 | 1 | 0 |  | 1 |
| 2 | 1 | 0 | 1 | 1 | 0 | 1 | 0 |  | 1 |
| ... | 0 | 0 | 1 | 1 | 0 | 1 | 0 | 1 | 1 |
| N | 1 | 0 | 1 | 1 | 0 | 1 | 1 | 1 | 1 |

FIG. 12

STORAGE SYSTEM BACKUP AND DE-DUPLICATION

TECHNICAL FIELD

The present application relates generally to storing files in computer storage systems.

BACKGROUND

Computer storage systems can provide data storage, modification and access to multiple users. This data can be represented as files in a computer file system. In some examples, duplicate copies of data can be stored, and this duplicate data can be reduced through a de-duplication process.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which:

FIG. 5 illustrates an example feature vector produced from a transformation of a bag-of-words representation for storage system backup and de-duplication, in accordance with certain embodiments of this disclosure;

FIG. 9 illustrates an example matrix of files and data segments for storage system backup and de-duplication, in accordance with certain embodiments of this disclosure;

FIG. 10 illustrates an example minhash signature table for storage system backup and de-duplication, in accordance with certain embodiments of this disclosure;

FIG. 12 illustrates an example table for storing data segments for groups of similar files for storage system backup and de-duplication, in accordance with certain embodiments of this disclosure;

DETAILED DESCRIPTION

Overview

Figure 1:
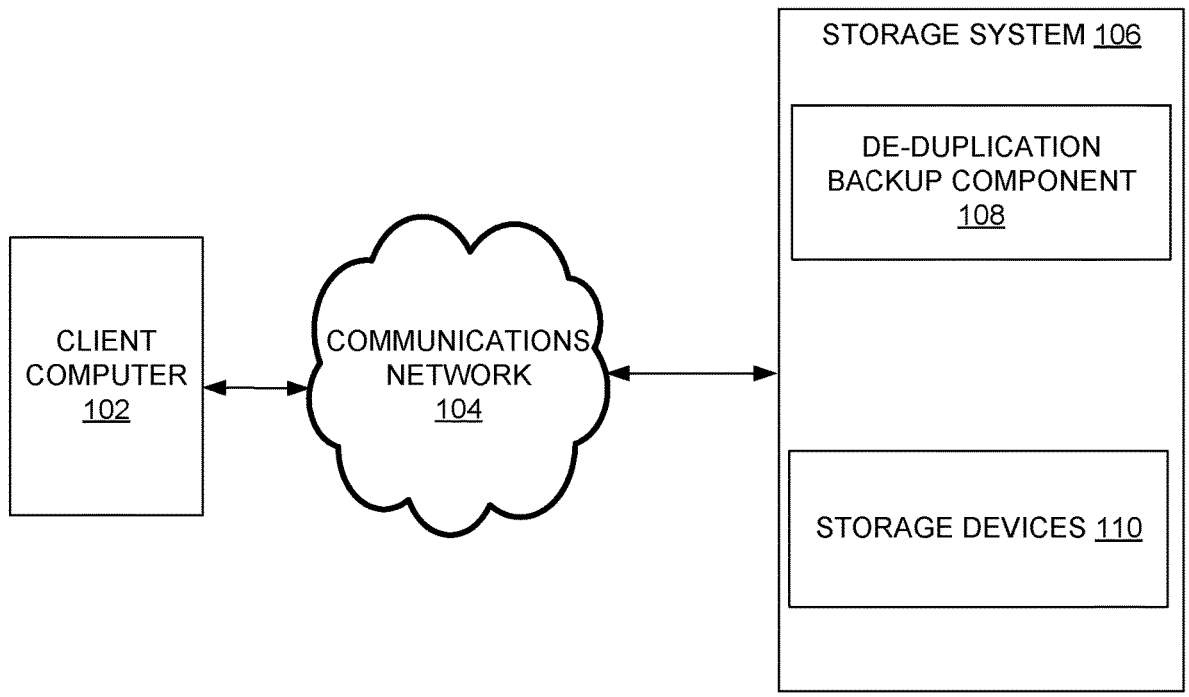
FIG. 1 illustrates an example system architecture that can facilitate storage system backup and de-duplication, in accordance with certain embodiments of this disclosure.

A feature of a storage system can be data protection. One approach with data protection can be to identify and eliminate redundant data. Eliminating redundant data can be done at the file level, and at the sub-file level, where a portion of a file is redundant relative to some other data and so is eliminated. This can generally be referred to as de-duplication.

An approach to identifying data for de-duplication can utilize hashing. In some examples, file-level de-duplication can be performed quickly, but the check uses only file metadata, so can miss some duplicate data. In some examples, sub-file-level de-duplication can be time-consuming, and increase a back-up window that indicates how long a backup process takes to perform.

Additionally, file-level de-duplication can detect and remove identical copies of the same files. While this can be implemented simply and performed quickly, it does not address the content inside the files. For example, two presentation deck files that have the exact same slides, but different titles will not be considered to be duplicates, so will be stored as two copies.

With a sub-file-level de-duplication, a file is broken into multiple chunks, and each chunk is compared, with only unique chunks being stored (and pointers to these unique chunks used in place of the removed duplicate chunks). A problem with sub-file-level de-duplication techniques is that they do not consider image data for de-duplication.

An issue with sub-file variable-length de-duplication approaches can be that they cannot find duplicates within a given data segment. In addition, data segment comparison can be performed through general hashing, so does not take advantage of NLP and clustering techniques, and can be slow.

According to the present techniques, storage system backup and de-duplication can be implemented, where efficiency is improved and an overall backup time window is reduced. In some examples, these techniques can be considered to be a hybrid of a file-level and sub-file-level approach.

In some examples, comparing every file against every other file in a set of files can be computationally burdensome. An approach according to the present techniques can be reduce the total set of files into smaller groups of similar files, and search for duplicates in these smaller sets, which can reduce the amount of time and computer processing resources involved with de-duplication.

A plurality of files can be selected for de-duplication analysis. Using a natural language processing (NLP) technique, each file can be converted into a bag of words representation. Using the bag of words representations and a clustering technique, a group of similar files that meet a predefined similarity threshold can be determined.

From this group of similar files (multiple separate groups of similar files can be analyzed), similar files can further be filtered based on having a certain similarity score. For example, there could be five groups of similar files. One of these groups could contain 10 files, with six of those 10 files meeting a similarity score of 0.9 or above.

Of these further-refined groups of similar files, a matrix can be determined that represents the group of files. In such a matrix, a row can represent a file, and a column can represent a data segment (sometimes referred to as a word or a chunk) contained within the files. The matrix can then indicate which files contain which data segments.

A minhash (sometimes referred to as min-hash) technique can be applied to this matrix to reduce a higher-dimensionality feature space of the matrix into a lower-dimensionality feature space of a table. Then, a locality sensitive hashing technique can be applied to this resulting table to identify duplicate data segments (which can be referred to as 100% similar data segments). One copy of each duplicate data segment can be stored in computer storage, with the other duplicate data segments discarded, thus saving on computer storage space.

The present techniques can be utilized to convert high-dimensional data to low-dimensional data, which can provide for quickly and efficiently implementing de-duplication.

The present techniques can be utilized for off-line de-duplication, which can be viewed in contrast to in-line de-duplication.

There can be techniques for de-duplication at the data block level, in contrast to these techniques that can operate at a file level (and a sub-file level). Block-level de-duplication can be elaborate, computationally-expensive, and take a relatively long time. In contrast, de-duplication according to the present techniques, de-duplication can be achieved at a higher level of abstraction (the file or sub-file level), which can lead to a gain in efficiency in terms of both performance and a de-duplication detection rate.

The present techniques can utilize a NLP approach, which can generally convert text to a sequence of numbers. Doing so can offer a powerful abstraction at a higher level of data storage.

According to the present techniques, duplicate data can first be done using an approximation, using bag of words and clustering techniques, which are not computer-processing-resource intensive. For example, these can be run as edge analytic tasks. From this initial pass, the top N duplicate files can be selected, and each file can be converted into a low-dimensional vector. Using a locality sensitive hashing technique, a list of duplicate documents can further be narrowed down to near-duplicate documents. Then, using chunking, each unique chunk (or data segment) can be stored, with duplicate chunks discarded, to reduce the overall size of computer storage capacity used to store the files.

In this manner, several iterations on file data can be performed to quickly identify duplicate data within a large set of files.

Several aspects of the present techniques can be configurable to fit many data backup and de-duplication scenarios. The present techniques can be run as an edge-analytic solution because they do not utilize intensive computing resources to detect duplicates. Shingle length can be configurable, which can provide for a greater flexibility to store each chunk only once in computer storage, even if the files are not near-duplicates.

Example Architectures

FIG. 1 illustrates an example system architecture 100 that can facilitate storage system backup and de-duplication, in accordance with certain embodiments of this disclosure. As depicted, system architecture 100 comprises client computer 102, communications network 104, and storage system 106. In turn, storage system 106 comprises de-duplication backup component 108 and storage devices 110.

Figure 14:
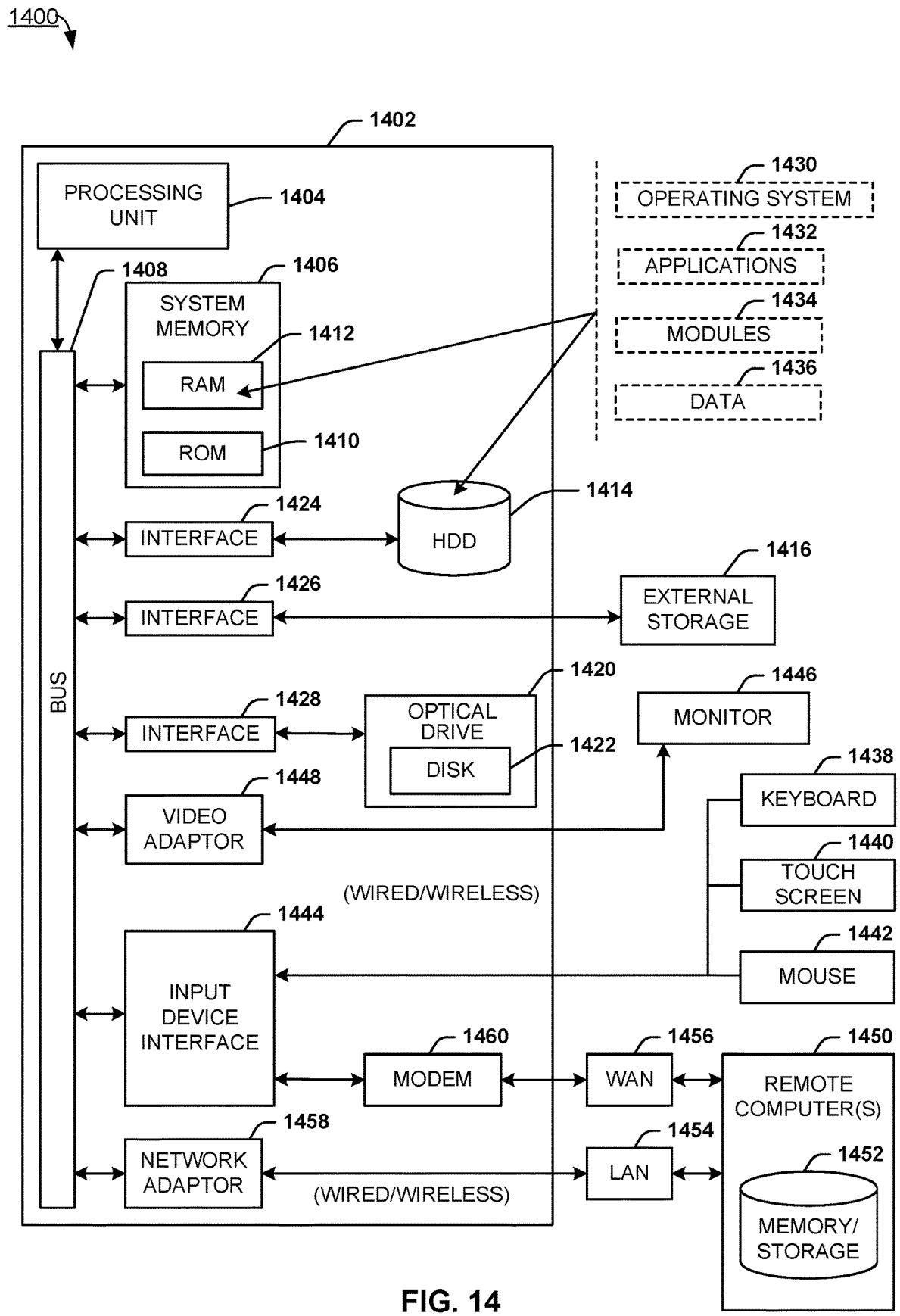
FIG. 14 illustrates an example block diagram of a computer operable to execute certain embodiments of this disclosure.

Each of client computer 102 and storage system 106 can be implemented with one or more instances of computer 1402 of FIG. 14. In some examples, storage system 106 comprises a distributed storage system that comprises multiple instances of computer 1402 of FIG. 14. In some examples, each of de-duplication backup component 108 and storage devices 110 can be implemented with machine-executable instructions and/or aspects of computer 1402 of FIG. 14.

Communications network 104 can comprise a computer communications network, such as the INTERNET, or an isolated private computer communications network.

Client computer 102 can access storage system 106 via communications network 104. In some examples, client computer 102 can access computer storage resources provided by storage system 106, such as to read, write, create, or delete one or more files stored in a file system that is stored on storage devices 110. Storage devices 110 can generally comprise one or more computer storage devices that can persistently store computer data.

De-duplication backup component 108 can analyze files stored on storage devices 110 and remove duplicate data, thus conserving storage space on storage devices 110.

Figure 3:
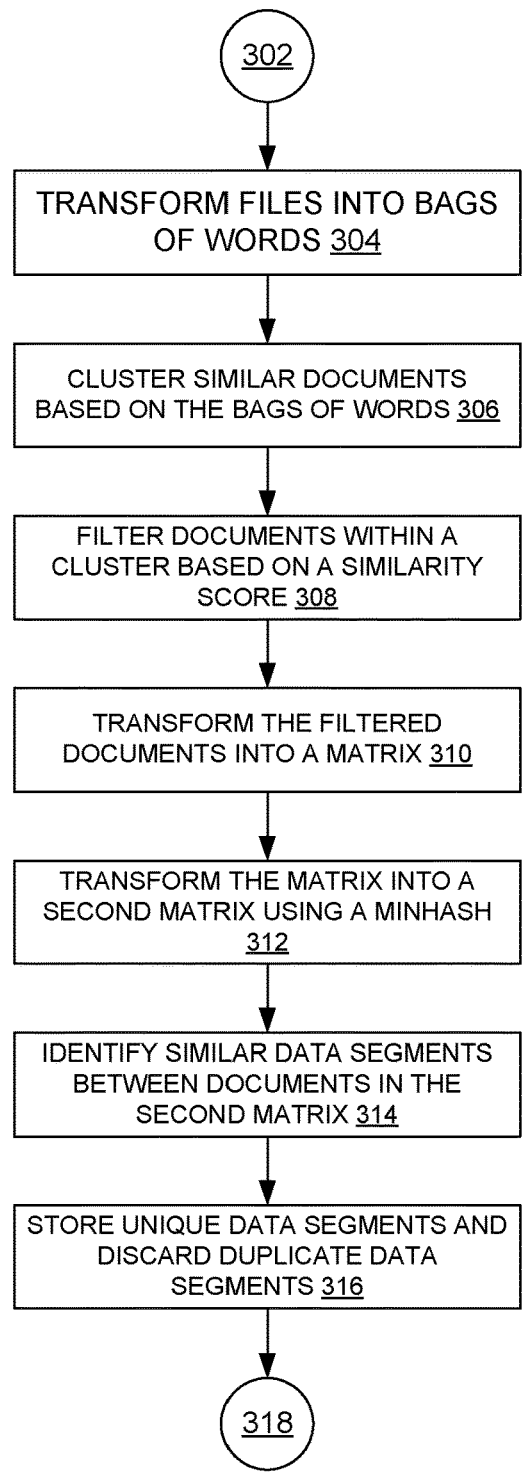
FIG. 3 illustrates an example process flow for storage system backup and de-duplication, in accordance with certain embodiments of this disclosure.
Figure 13:
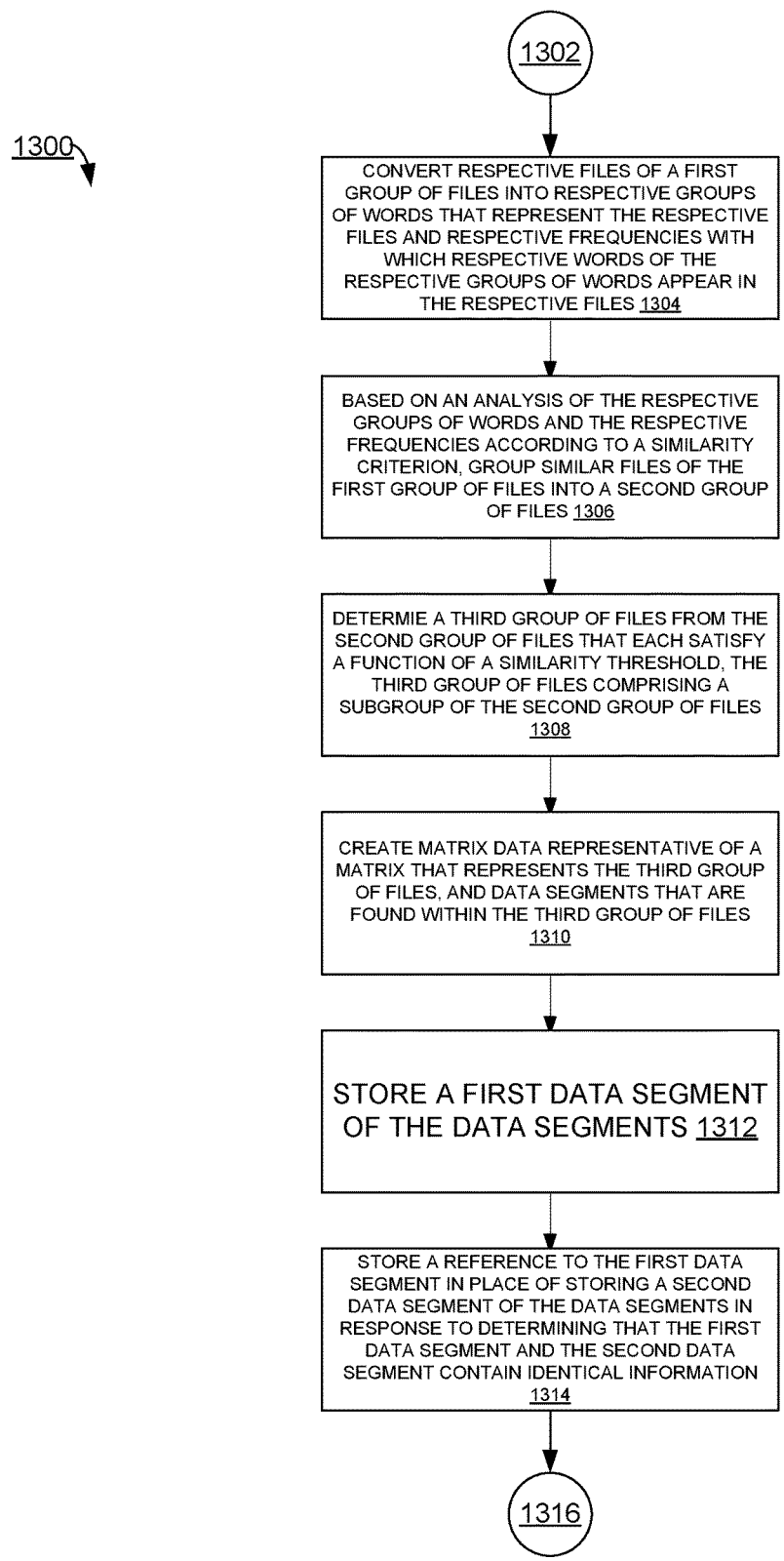
FIG. 13 illustrates another example process flow for storage system backup and de-duplication, in accordance with certain embodiments of this disclosure.

In implementing storage system backup and de-duplication in this manner, de-duplication backup component 108 can implement aspects of process flow 300 of FIG. 3, and/or process flow 1300 of FIG. 13. As part of doing so, de-duplication backup component 108 can utilize the techniques described with respect to FIGS. 4-12.

Figure 2:
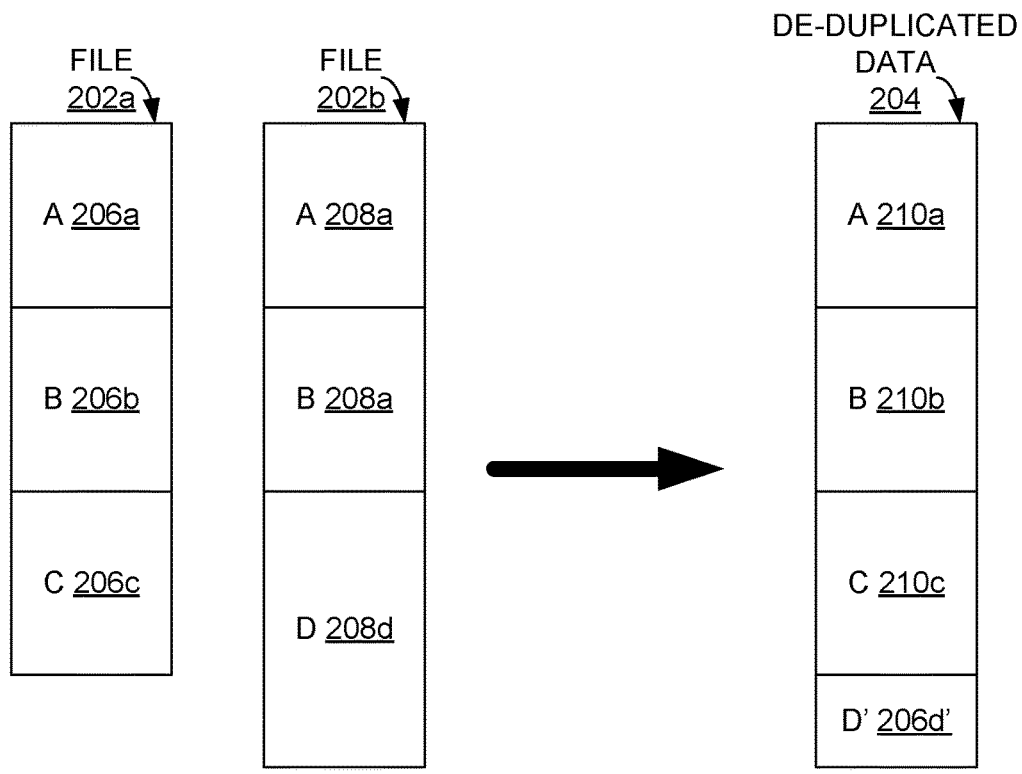
FIG. 2 illustrates an example de-duplication of data for storage system backup and de-duplication, in accordance with certain embodiments of this disclosure.

FIG. 2 illustrates an example de-duplication of data 200 for storage system backup and de-duplication, in accordance with certain embodiments of this disclosure. In some examples, de-duplication backup component 108 of FIG. 1 can process file 202a and file 202b to produced de-duplicated data in de-duplicated data 204.

As depicted, file 202a comprises data segment A 206a, data segment B 206b, and data segment C 206c. File 202b comprises data segment A 208a, data segment B 208b, and data segment D 208d. Each of file 202a and file 202b contains three pages. The first two pages are identical, and the files differ only in the third page (e.g., file 202b contains an additional paragraph of text appended to the file relative to file 202a).

In an example, de-duplication backup component 108 can determine that data segment A 206a and data segment A 208a contain duplicate data relative to each other, and that data segment B 206b and data segment B 208b contain duplicate data relative to each other.

Additionally, de-duplication backup component 108 can determine that data segment C 206c contains duplicate data with a portion—but not all of—data segment 208d. In this case, de-duplication backup component 108 can determine what sub-portion of data segment 208d is the same as data segment C 206c and de-duplicate it so that just one copy of this data is stored.

As a result of performing de-duplication, de-duplication backup component 108 can create de-duplicated data 204. De-duplicated data 204 comprises data segment A 210a, which can be one copy of the data stored in both data segment A 206a and data segment A 208a. De-duplicated data 204 comprises data segment B 210b, which can be one copy of the data stored in both data segment B 206b and data segment B 208b. De-duplicated data 204 comprises data segment C 210*c*, which can be the same data that is stored in data segment 206*c* of file 202*a*.

Then, de-duplicated data 204 comprises data segment D' 210*d*', which is the data of data segment 208*d* of file 202*b* that is different from the data of data segment C 206*c*. That is, the data of data segment C 206*c* and data segment D' 210*d*' can be combined to produce the data of data segment 208*d*.

In this manner, de-duplication backup component 108 can store all of the data of file 202*a* and file 202*b* in de-duplicated data 204 while saving computer storage space by eliminating duplicated data.

Example Process Flows, Graphs, and Transformations

FIG. 3 illustrates an example process flow 300 for determining whether a file modification is configured for user tracking to facilitate tracking users modifying a file, in accordance with certain embodiments of this disclosure. In some examples, aspects of process flow 300 can be implemented by de-duplication backup component 108 of FIG. 1, or computing environment 1400 of FIG. 14.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with aspects of process flow 1300 of FIG. 13.

Process flow 300 begins with 302, and moves to operation 304. Operation 304 depicts transforming files into bags of words. In some examples, this can comprise performing similar operations as involved with transformation 400 of FIG. 4. After operation 304, process flow 300 moves to operation 306.

Operation 306 depicts clustering similar files based on the bags of words. In some examples, this can comprise performing similar operations as with transformation 400 of FIG. 4 into feature vector 500 of FIG. 5, then the transformation of feature vector 500 to cluster graph 600 of FIG. 6, and then the transformation of cluster graph 600 of FIG. 6 to identify a group of similar files 708 of FIG. 7. After operation 306, process flow 300 moves to operation 308.

Operation 308 depicts filtering files within a cluster based on a similarity score. In some examples, this filtering can be similar to that involved with identifying a subset of a group of similar files 802 in FIG. 8. After operation 308, process flow 300 moves to operation 310.

Operation 310 depicts transforming the filtered files into a matrix. This can be similar to the transformation used to create matrix 900 of FIG. 9. After operation 310, process flow 300 moves to operation 312.

Operation 312 depicts transforming the matrix into a second matrix using a minhash. This second matrix can be similar to signature table 1000 of FIG. 10 and can be produced in a similar manner, from the matrix of operation 310. After operation 312, process flow 300 moves to operation 314.

Operation 314 depicts identifying similar data segments between files in the second matrix. In some examples, operation 314 can be implemented using similar techniques as used to identify similar files as described with regard to FIG. 11. After operation 314, process flow 300 moves to operation 316.

Operation 316 depicts storing unique data segments, and discarding duplicate data segments. In some examples, operation 316 can be implemented using similar techniques as used to store data segments in table 1200 of FIG. 12. After operation 316, process flow 300 moves to 318, where process flow 300 ends.

Figure 4:
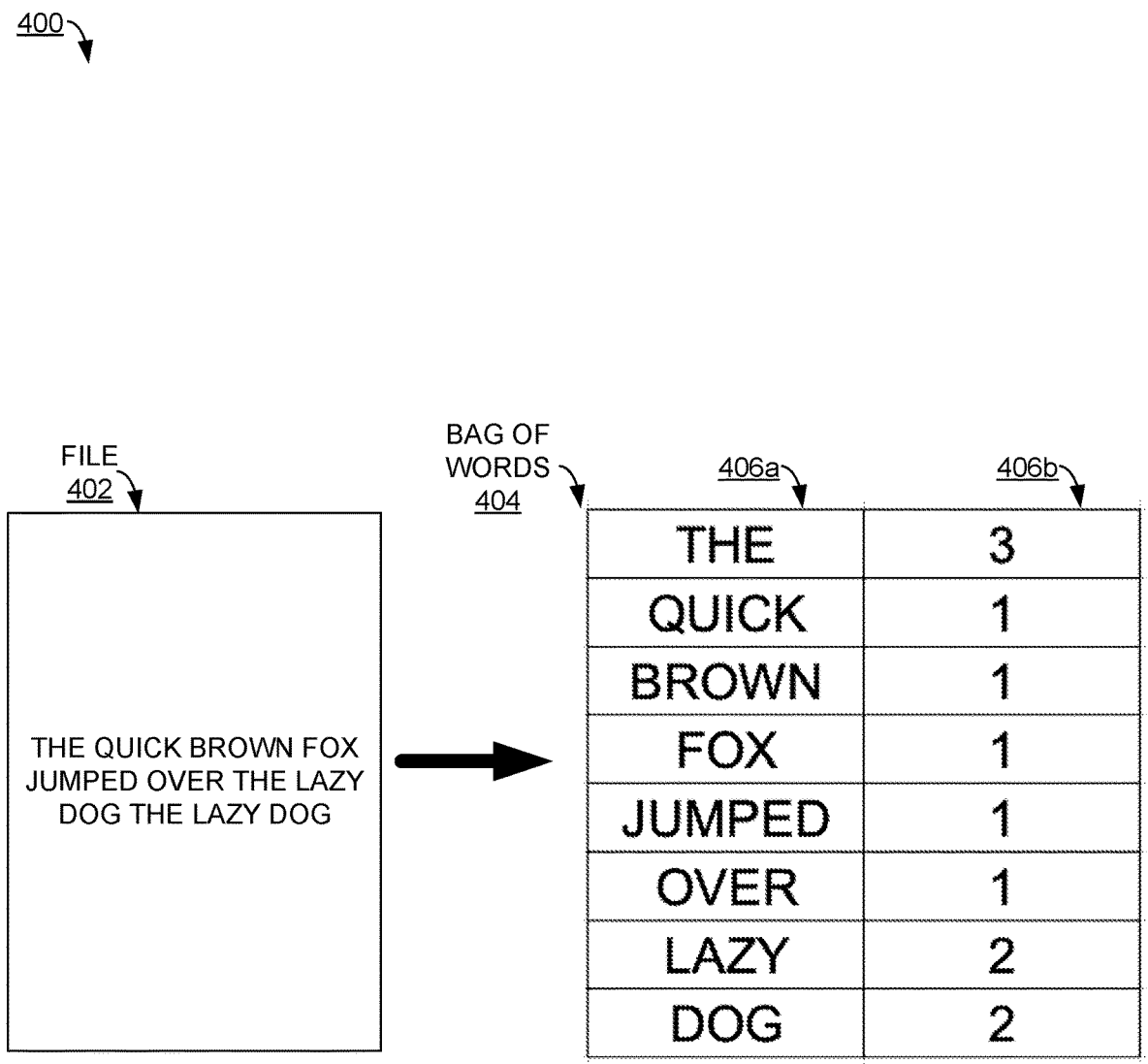
FIG. 4 illustrates an example transformation of a file into a bag-of-words representation for storage system backup and de-duplication, in accordance with certain embodiments of this disclosure.

FIG. 4 illustrates an example transformation 400 of a file into a bag-of-words representation for storage system backup and de-duplication, in accordance with certain embodiments of this disclosure. In some examples, de-duplication backup component 108 of FIG. 1 can transform a file into a corresponding bag-of-words representation.

Transformation 400 comprises file 402 and bag of words 404. File 402 contains the text, "the quick brown fox jumped over the lazy dog the lazy dog."

Bag of words 404 catalogs each different word in column 406*b* and a corresponding number of occurrences of that word in column 406*b*. For example, "the" appears 3 times in file 402, "quick" appears once in file 402, and "lazy" appears twice in file 402.

In some examples, a bag of words representation of a file does not attempt to maintain an order of the words of the file, or a meaning of phrases and sentences formed in the file. Rather, the bag of words representation catalogs words present in the file and a number of occurrences of each word, without regard to context and broader meaning.

With a bag of words approach, each file stored on disk can be tokenized, and converted into a bag of words.

Figure 5:
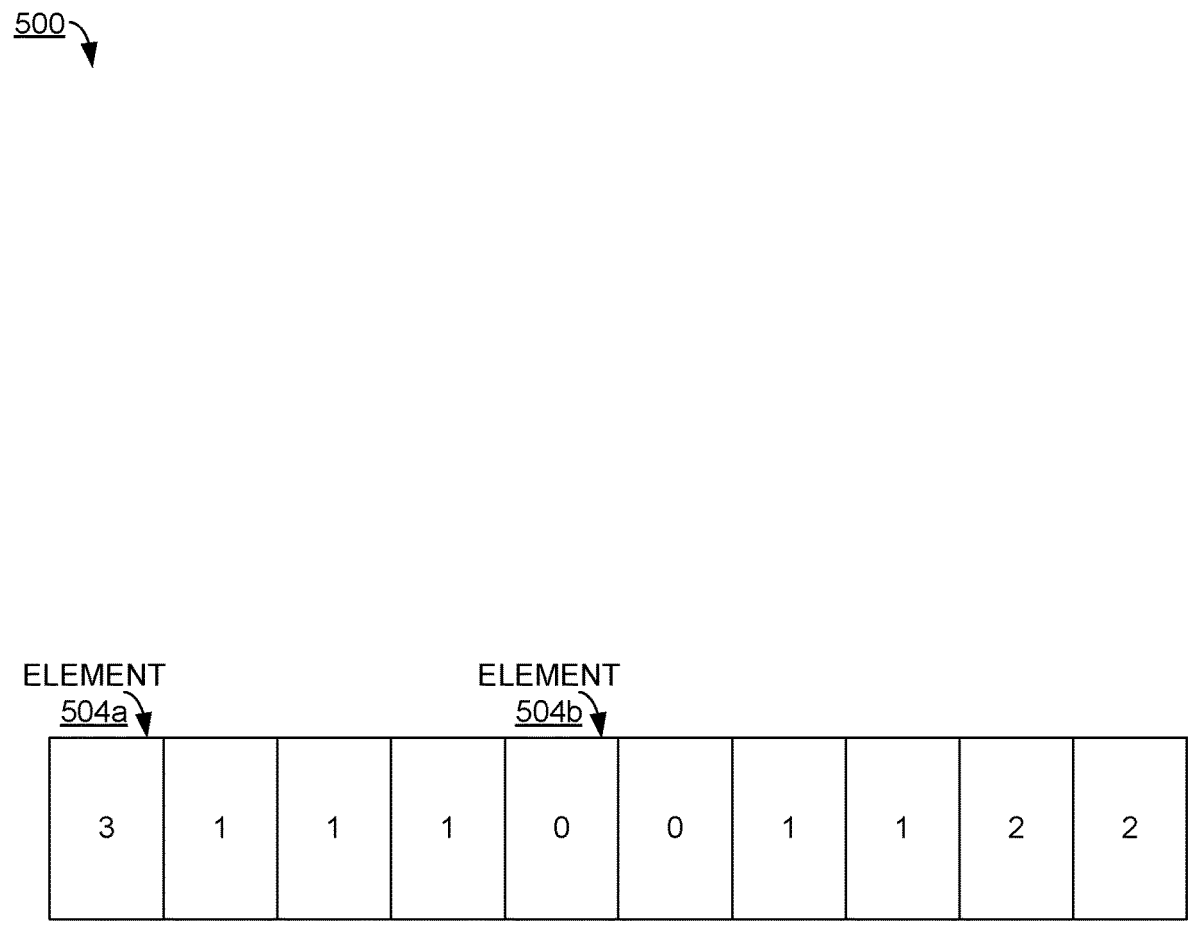

FIG. 5 illustrates an example feature vector 500 produced from a transformation of a bag-of-words representation for storage system backup and de-duplication, in accordance with certain embodiments of this disclosure. In some examples, de-duplication backup component 108 of FIG. 1 can generate feature vector 502 from bag of words 404 of FIG. 4.

Feature vector 502 identifies—for one file—a number of occurrences of each word across all files being analyzed, without identifying that word. For example, element 504*a* stores 3, which corresponds to a number of occurrences of "the" in bag of words 404.

Then, there can be elements of a feature vector that store a value of zero, such as element 504*b*. This can indicate that a particular word is found in some other file in the group of files being analyzed, but is not found in the file that corresponds to this feature vector—in this case, feature vector 502. That is, the word that corresponds to element 504*b* could be a word not found in file 402, like the word "blue."

A separate feature vector can be generated for each file for which de-duplication is being performed. The same element of each feature vector will correspond to the same word. That is, every second element of a feature vector using the example of FIG. 5 can identify how many occurrences of "brown" are in a particular file.

Figure 6:
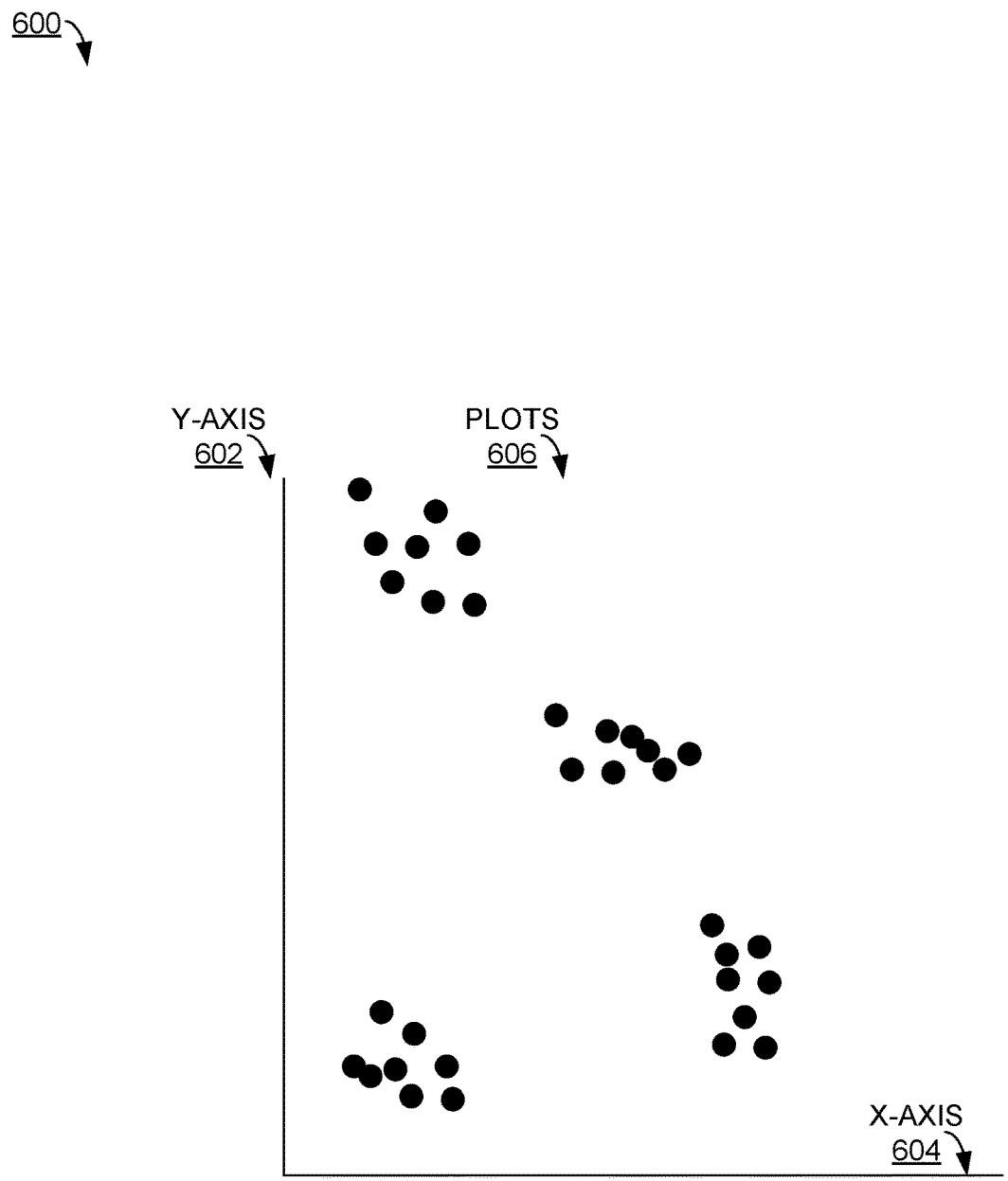
FIG. 6 illustrates an example cluster graph produced from a transformation of a feature vector for storage system backup and de-duplication, in accordance with certain embodiments of this disclosure.

FIG. 6 illustrates an example cluster graph 600 produced from a transformation of a feature vector for storage system backup and de-duplication, in accordance with certain embodiments of this disclosure. In some examples, de-duplication backup component 108 of FIG. 1 can reduce N-dimensional feature vectors (e.g., feature vector 502 of FIG. 5) of the files being analyzed into a two-dimensional space, and plot each feature vector.

Y-axis 602 represents a first dimension by which the files are measured, and X-axis 604 represents a second dimension by which the files are measured. Then, plots 606 can be made, where each plot corresponds to one file being analyzed. A plot for each file in plots 606 can be determined using a corresponding feature vector (e.g., feature vector 500 of FIG. 5). A density-based spatial clustering of applications with noise technique can be applied to each feature vector to determine where to place a plot for a corresponding file in the two-dimensional space of cluster graph 600.

Cluster graph 600 can then be analyzed to determine which files are similar to each other.

Figure 7:
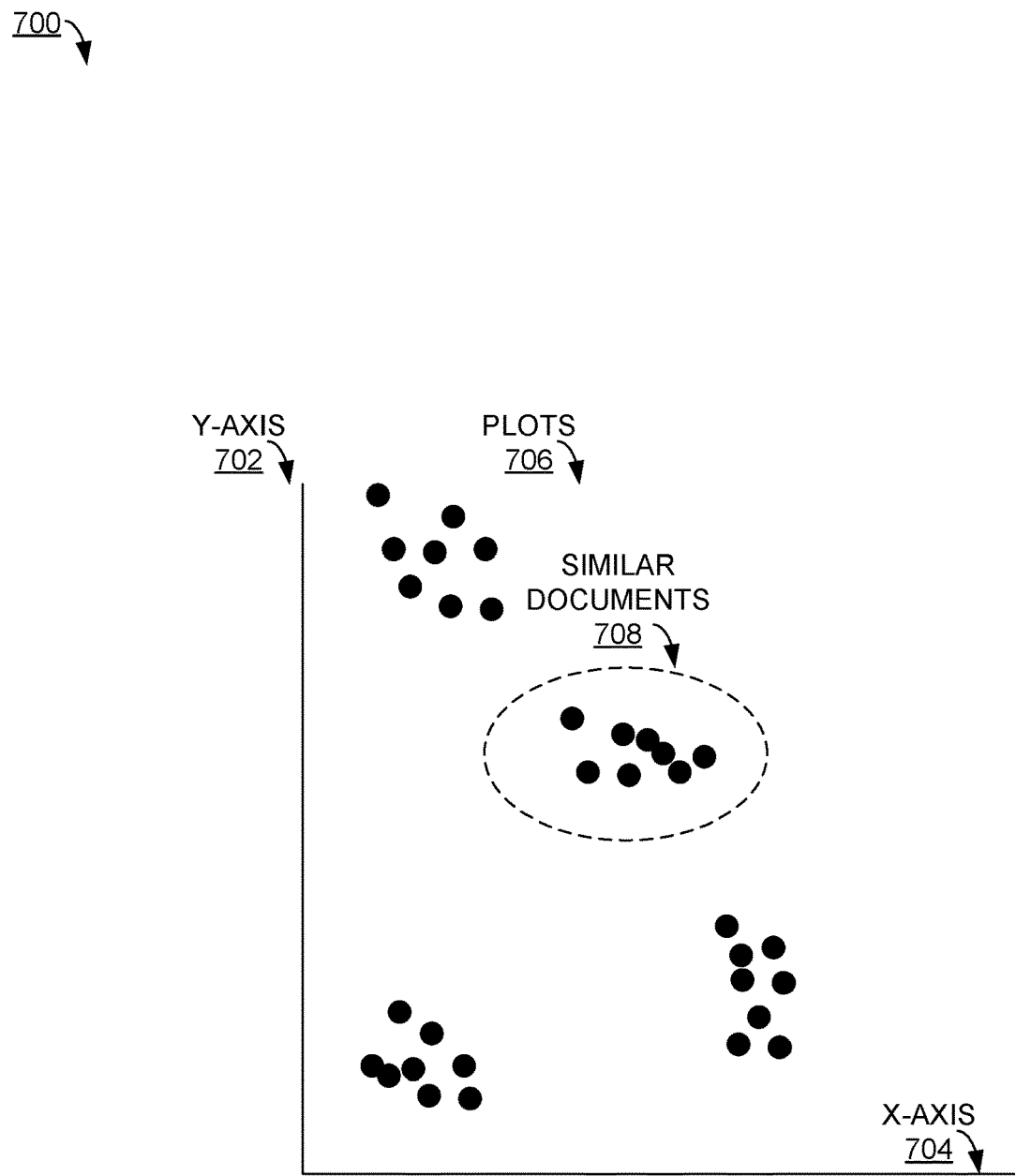
FIG. 7 illustrates an example cluster graph where a group of similar files is identified for storage system backup and de-duplication, in accordance with certain embodiments of this disclosure.

FIG. 7 illustrates an example cluster graph 700 where a group of similar files is identified for storage system backup and de-duplication, in accordance with certain embodiments of this disclosure. In some examples, de-duplication backup component 108 of FIG. 1 can identify separate clusters of files within cluster graph 600

Y-axis 702 can be similar to Y-axis 602 of FIG. 6; X-axis 704 can be similar to X-axis 604; and plots 706 can be similar to plots 606.

Here, group of similar files 708 is identified based on how they are plotted within the graph. In some examples, multiple groups of similar files can be identified.

Figure 8:
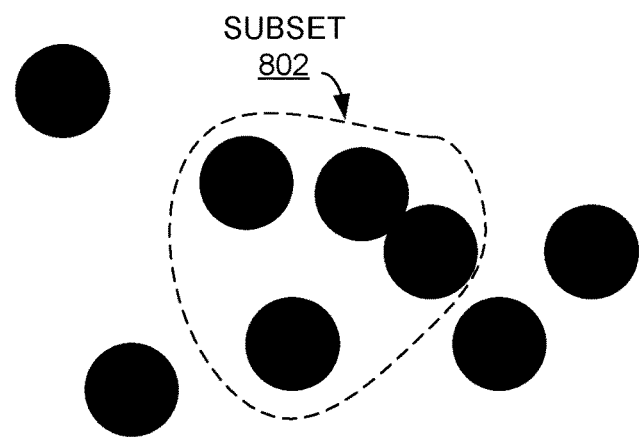
FIG. 8 illustrates an example group of similar files from a cluster graph where a subset of a group of similar files are identified that meet a similarity threshold for storage system backup and de-duplication, in accordance with certain embodiments of this disclosure.

FIG. 8 illustrates an example group of similar files 800 from a cluster graph where a subset of a group of similar files are identified that meet a similarity threshold for storage system backup and de-duplication, in accordance with certain embodiments of this disclosure. In some examples, de-duplication backup component 108 of FIG. 1 can analyze a group of similar files (e.g., group of similar files 708) to determine a subset of those files that are sufficiently similar to each other.

Subset 802 comprises a subset of similar files 708 that meet a given similarity threshold.

This is, using the clustered groups from cluster graph 700 of FIG. 7, similar documents can be filtered that meet a certain similarity score. For example, there couple be five groups. A group could contain 10 files, with six of those files meeting a similarity score of 0.9 or above.

In other examples, multiple subsets can be determined from one group of documents. For instance, multiple iterations of a K-nearest technique can be applied using a different value for a centrod for the technique.

FIG. 9 illustrates an example matrix 900 of files and shingles for storage system backup and de-duplication, in accordance with certain embodiments of this disclosure. In some examples, de-duplication backup component 108 of FIG. 1 can analyze a set of similar files (e.g., subset 802 of FIG. 8) to generate matrix 900.

A shingle can generally comprise an arbitrary-length subset of a word, or data segment. For example, consider the word "newyork" and a shingle length of two. Then, an output of a shingle process can be, "ne", "ew", "wy", "yo", "or", and "rk". That is, a shingle can be a sequential slicing of data in a file. A shingle length can be variable and configurable by an administrator of a storage system, which can assist with finding duplicates at a very granular level within a data segment.

Matrix 900 can identify files of the set of similar files, along with the presence of various shingles within each file. As depicted, matrix 900 is a two-dimension matrix that comprises rows 902 and columns 904. Each row of rows 902 can identify a particular file and whether that file contains various shingles.

With regard to columns 904, one column can be used to identify a particular file, and the other columns can be used to identify different shingles.

FIG. 10 illustrates an example minhash signature table 1000 for storage system backup and de-duplication, in accordance with certain embodiments of this disclosure. In some examples, de-duplication backup component 108 of FIG. 1 can analyze a matrix that identifies files and corresponding data segments (e.g., matrix 900 of FIG. 9) to generate signature table 1000. In a minhash approach, each file can be given a signature using minhash for a quick comparison with other files. That is, minhash techniques can be utilized to estimate how similar two files are.

Signature table 1000 can identify the same files as found in the matrix from which signature table 1000 is generated (e.g., the files identified in matrix 900 of FIG. 9). As depicted, signature table 1000 comprises rows 1002 and columns 1004. Each row of rows 1002 can identify a particular file and whether that file contains various hash signatures (where each hash signature can identify a data segment).

With regard to columns 1004s, one column can be used to identify a particular file, and the other columns can be used to identify different hash signature.

Matrix 900 can be relatively high-dimensional relative to signature table 1000. Matrix 900 can be converted into the lower-dimension signature table 1000 without information loss, for a faster comparison of data, and by using a minhashing technique.

Figure 11:
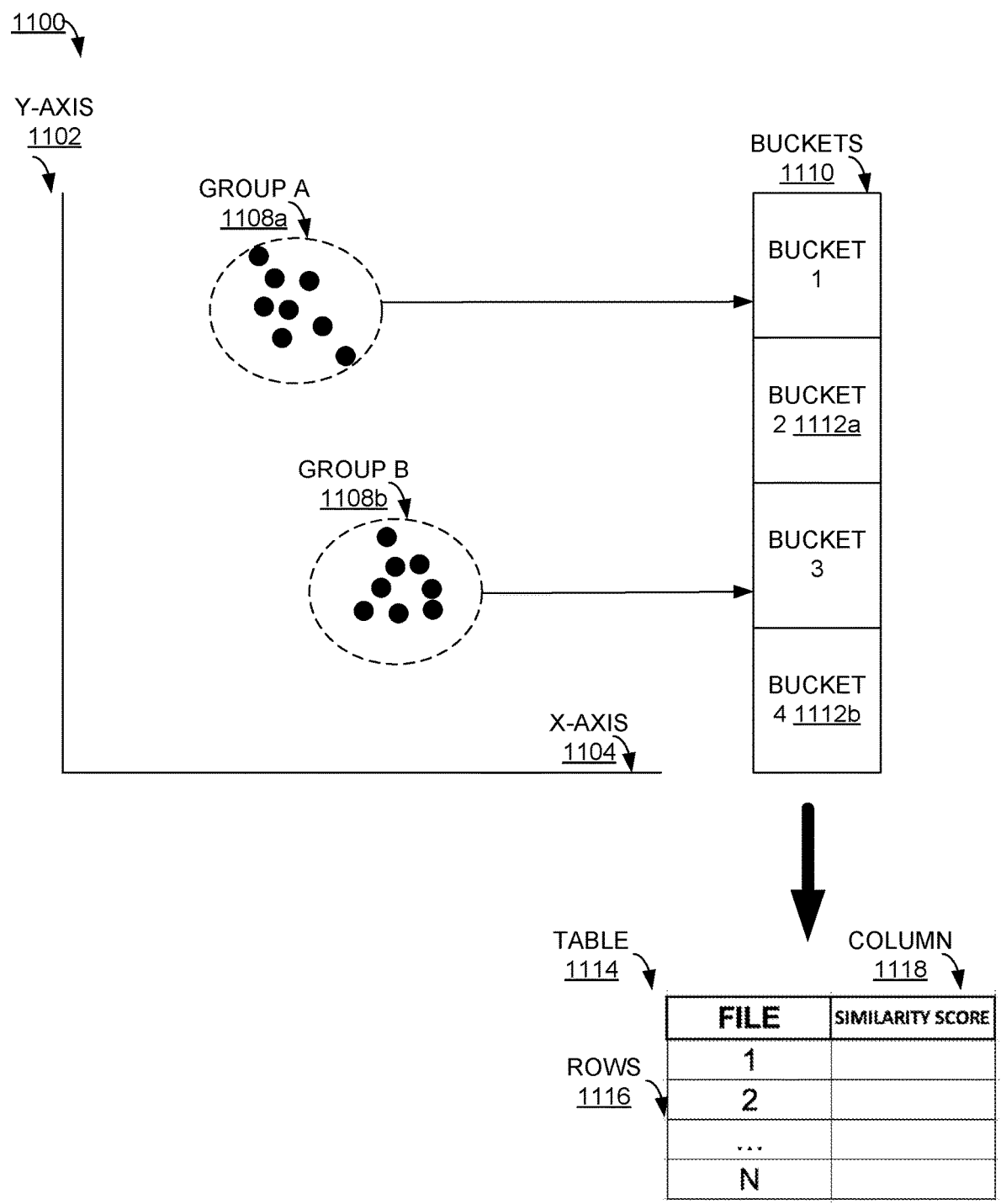
FIG. 11 illustrates an example transformation of applying locality-sensitive hashing to identify similar files for storage system backup and de-duplication, in accordance with certain embodiments of this disclosure.

FIG. 11 illustrates an example transformation 1100 of applying locality-sensitive hashing to identify similar files for storage system backup and de-duplication, in accordance with certain embodiments of this disclosure. In some examples, de-duplication backup component 108 of FIG. 1 can apply the techniques of FIG. 11 to a signature table, such as signature table 1000 of FIG. 10.

The files as identified in a signature table generated via minhash techniques can be then plotted on graph 1102, where Y-axis 1104 measures one dimension of each file, and X-axis 1106 measures another dimension of each file. The files plotted in graph 1102 can be determined to fall within two groups of files—group A 1108a and group B 1108b.

Each group of files can be assigned to a different bucket of buckets 1110. As depicted, the files of group A 1108a are assigned to bucket 1112a of buckets 1110. And, the files of group B 1108b are assigned to bucket 1112a of buckets 1110.

Then, the files of each bucket (e.g., the files of bucket 1 1112a) can be transformed into table 1114, using a k-nearest neighbor technique.

Table 1114 comprises rows 1116 and columns 1118. Each row of rows 1116 can refer to one file. Then, one column of columns 1118 can be used to identify a file, and another column of columns 1118 can be used to identify a similarity score for a file.

FIG. 12 illustrates an example table 1200 for storing data segments for groups of similar files for storage system backup and de-duplication, in accordance with certain embodiments of this disclosure. In some examples, de-duplication backup component 108 of FIG. 1 can generate table 1200 from a table generated using locality-sensitive hashing, such as table 1114 of FIG. 11.

Table 1200 comprises rows 1202 and columns 1204. Each row of rows can regard a particular file. One column of columns 1204 can identify files, and the other columns of columns 1204 can identify different data segments.

Then, one copy of each data segment can be stored in a computer memory, and table 1200 can be utilized to determine how to assemble a particular file based on the component data segments. By storing one copy of each data segment where a data segment appears multiple times in the files—a form of de-duplication—storage space can be reserved.

Then, from table 1200, in some examples, only unique data segments across all the files are stored for backup, with pointers to these data segments used to indicate which data segments belong to which files.

FIG. 13 illustrates an example process flow 1300 for determining whether a file modification is configured for user tracking to facilitate tracking users modifying a file, in accordance with certain embodiments of this disclosure. In some examples, aspects of process flow 1300 can be implemented by de-duplication backup component 108 of FIG. 1, or computing environment 1400 of FIG. 14.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with aspects of process flow 300 of FIG. 3.

Process flow 1300 begins with 1302, and moves to operation 1304. Operation 1304 depicts converting respective files of a first group of files into respective groups of words that represent the respective files and respective frequencies with which respective words of the respective groups of words appear in the respective files. In some examples, operation 1304 can be implemented in a similar manner as described with respect to FIG. 4.

In some examples, operation 1304 comprises utilizing a bag-of-words transformation on the first group of files. In some examples, operation 1304 comprises applying natural language processing to the first group of files.

In some examples, for each respective file of the first set of files, the respective set of words comprises a first identification of each word in the respective file and a second identification of a number of times that each word appears in the respective file. This can be a bag of words representation.

In some examples, operation 1304 comprises converting each respective file of a first set of files into a respective set of words via a respective result of a respective bag-of-words analysis.

In some examples, respective sets of words of the first set of files have a first number of dimensions, and the second set of files are grouped according to a second number of dimensions, the first number of dimensions being greater than the second number of dimensions. That is, a bag of words representation can have M dimensions, and this can be reduced to N dimensions, where M>N.

In some examples, operation 1304 comprises converting each file of first files into component words. After operation 1304, process flow 1300 moves to operation 1306.

Operation 1306 depicts, based on an analysis of the respective groups of words and the respective frequencies according to a similarity criterion, grouping similar files of the first group of files into a second group of files. In some examples, operation 1306 can comprise plotting the files on a graph in similar manner as described with respect to FIG. 6, and identifying similar files in a similar manner as described with respect to FIG. 7.

In some examples, operation 1306 comprises grouping a first group of similar files of the first group of files into the second group of files according to a first similarity criterion, and grouping a second group of similar files of the first group of files into a fourth group of files according to a second similarity criterion. That is, the files can be graphed on a cluster graph, and multiple clusters, or groups, of files can be identified from the clustering.

In some examples, operation 1306 comprises, based on an analysis of respective sets of words representations of the first set of files and with reference to a first similarity threshold, grouping similar files of the first set of files into a second set of files.

In some examples, operation 1306 comprises grouping similar files of the first files into second files based on an analysis of respective words representation of the first files. After operation 1306, process flow 1300 moves to operation 1308.

Operation 1308 depicts determining a third group of files from the second group of files that each satisfy a function of a similarity threshold, the third group of files comprising a subgroup of the second group of files. In some examples, operation 1308 can be implemented in a similar manner as described with respect to FIG. 8.

In some examples, operation 1308 comprises determining a third set of files from the second set of files, the files of the third set of files being determined with reference to a second similarity threshold. In some examples, the third set of files comprises a subset of the second set of files. In some examples, operation 1308 comprises determining the third set of files from the second set of files based on applying a k-nearest technique to a centrod file of the second set of files.

In some examples, operation 1308 comprises determining, from the second files, third files that satisfy a function of a similarity threshold, the third files comprising fewer files than the second files. After operation 1308, process flow 1300 moves to operation 1310.

Operation 1310 depicts creating matrix data representative of a matrix that represents the third group of files, and data segments that are found within the third group of files. In some examples, this matrix can be implemented in a similar manner as described with respect to one or more of FIGS. 9-12.

In some examples, the matrix data is first matrix data representative of a first matrix, and operation 1310 can comprise transforming the first matrix data into second matrix data representative of a second matrix, wherein a first number of dimensions of the first matrix is larger than a second number of dimensions of the second matrix, and wherein the first data segment and the second data segment are identified in the second matrix. That is, a transformation between that which is depicted in FIG. 9 and FIG. 10 can be performed using a minhash approach, or process.

In some examples, the transforming comprises transforming the second matrix into a third matrix using a locality sensitive hashing process. That is, a transformation can be performed between that which is depicted in FIG. 10 and FIG. 12.

In some examples, operation 1310 comprises generating information representing a matrix that represents the third set of files, and data segments that are found within the third set of files. In some examples, rows of the matrix represent the third set of files, and columns of the matrix represent the data segments. In some examples, the data segments have a variable length relative to each other.

In some examples, operation 1310 comprises creating a representation of data segments that are found within the third files. In some examples, the representation of data segments comprises a matrix that represents the third files along a first dimension and the data segments along a second dimension.

In some examples, the matrix is a first matrix, and operation 1310 comprises determining a second matrix from the first matrix, the second matrix having a second number of dimensions, the first matrix having a first number of dimensions, and the second number of dimensions being less than the first number of dimensions.

In some examples the determining of the second matrix comprises determining the second matrix using a minhash process applied to the first matrix. In some examples, the determining of the second matrix comprises transforming the second matrix into a third matrix using a locality sensitive hashing process applied to the first matrix.

After operation 1310, process flow 1300 moves to operation 1312.

Operation 1312 depicts storing a first data segment of the data segments. In an example, this can comprise storing the first data segment on storage devices 110 of FIG. 1.

After operation 1312, process flow 1300 moves to operation 1314.

Operation 1314 depicts storing a reference to the first data segment in place of storing a second data segment of the data segments in response to determining that the first data segment and the second data segment contain identical information. That is, using the example of FIG. 12, it can be determined that two data segments are duplicates of each other. One copy of this duplicate data can be stored (e.g., on storage devices 110) and then a reference can be made to this one copy of the stored data where the data segment is utilized by different files.

In some examples, operations 1312-1314 can comprise storing one copy of duplicate data segments. In some examples, operations 1312-1134 comprise storing one copy of duplicate data segments in a data store. In some examples, the storing of the one copy of duplicate data segments comprises storing the one copy of duplicate data segments based on the second matrix.

After operation 1314, process flow 1300 moves to 1316, where process flow 1300 ends.

Example Operating Environment

In order to provide additional context for various embodiments described herein, FIG. 14 and the following discussion are intended to provide a brief, general description of a suitable computing environment 1400 in which the various embodiments of the embodiment described herein can be implemented.

For example, aspects of computing environment 1400 can be used to implement aspects of client computer 102, storage system 106, de-duplication backup component 108, and/or storage devices 110 of FIG. 1. In some examples, computing environment 1400 can implement aspects of the process flows of FIG. 3 and/or FIG. 13 to facilitate storage system backup and de-duplication.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1494 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        converting respective files of a first group of files into respective groups of words that represent the respective files and respective frequencies with which respective words of the respective groups of words appear in the respective files;
        based on an analysis of the respective groups of words and the respective frequencies according to a similarity criterion, grouping similar files of the first group of files into a second group of files;
        determining a third group of files from the second group of files that each satisfy a function of a similarity threshold, the third group of files comprising a subgroup of the second group of files;
        creating matrix data representative of a matrix that represents the third group of files, and data segments that are found within the third group of files;
        storing a first data segment of the data segments; and
        storing a reference to the first data segment in place of storing a second data segment of the data segments in response to determining that the first data segment and the second data segment contain identical information.

2. The system of claim 1, wherein the matrix data is first matrix data representative of a first matrix, and wherein the operations further comprise:
    transforming the first matrix data into second matrix data representative of a second matrix, wherein a first number of dimensions of the first matrix is larger than a second number of dimensions of the second matrix, and wherein the first data segment and the second data segment are identified in the second matrix.

3. The system of claim 2, wherein the transforming comprises transforming using a minhash process.

4. The system of claim 2, wherein the transforming comprises transforming the second matrix into a third matrix using a locality sensitive hashing process.

5. The system of claim 1, wherein the converting comprises:
    utilizing a bag-of-words transformation on the first group of files.

6. The system of claim 1, wherein the converting comprises:
    applying natural language processing to the first group of files.

7. The system of claim 1, wherein the grouping comprises:
    grouping a first group of similar files of the first group of files into the second group of files according to a first similarity criterion, and grouping a second group of similar files of the first group of files into a fourth group of files according to a second similarity criterion.

8. A method, comprising:
    converting, by a system comprising a processor, each respective file of a first set of files into a respective set of words via a respective result of a respective bag-of-words analysis;
    based on an analysis of respective sets of words representations of the first set of files and with reference to a first similarity threshold, grouping, by the system, similar files of the first set of files into a second set of files;
    determining, by the system, a third set of files from the second set of files, the files of the third set of files being determined with reference to a second similarity threshold;
    generating, by the system, information representing a matrix that represents the third set of files, and data segments that are found within the third set of files; and
    storing, by the system to a memory, one copy of duplicate data segments.

9. The method of claim 8, wherein respective sets of words of the first set of files have a first number of dimensions, and wherein the second set of files are grouped according to a second number of dimensions, the first number of dimensions being greater than the second number of dimensions.

10. The method of claim 8, wherein rows of the matrix represent the third set of files, and columns of the matrix represent the data segments.

11. The method of claim 8, wherein the data segments have a variable length relative to each other.

12. The method of claim 8, wherein, for each respective file of the first set of files, the respective set of words comprises a first identification of each word in the respective file and a second identification of a number of times that each word appears in the respective file.

13. The method of claim 8, wherein the third set of files comprises a subset of the second set of files.

14. The method of claim 8, wherein the matrix representation of data segments comprises a matrix that represents the third files along a first dimension and the data segments along a second dimension.

15. A non-transitory computer-readable medium, excluding transitory signal transmission, and comprising instructions that, in response to execution, cause a system comprising a processor to perform operations, comprising:
    converting each file of first files into component words via a respective result of a respective bag-of-words analysis;
    grouping similar files of the first files into second files based on an analysis of respective words representation of the first files and with reference to a first similarity threshold;
    determining, from the second files, third files that satisfy a function of a second similarity threshold, the third files comprising fewer files than the second files;
    creating a matrix representation of data segments that are found within the third files and the third files; and
    storing one copy of duplicate data segments in a data store.

16. The non-transitory computer-readable medium, excluding transitory signal transmission, of claim 15, wherein the matrix representation of data segments comprises a matrix that represents the third files along a first dimension and the data segments along a second dimension.

17. The non-transitory computer-readable medium, excluding transitory signal transmission, of claim 16, wherein the matrix is a first matrix, and wherein the operations further comprise:
    determining a second matrix from the first matrix, the second matrix having a second number of dimensions, the first matrix having a first number of dimensions, and the second number of dimensions being less than the first number of dimensions.

18. The non-transitory computer-readable medium, excluding transitory signal transmission, of claim 17, wherein the storing of the one copy of duplicate data segments comprises storing the one copy of duplicate data segments based on the second matrix.

19. The non-transitory computer-readable medium, excluding transitory signal transmission, of claim 17, wherein the determining of the second matrix comprises determining the second matrix using a minhash process applied to the first matrix.

20. The non-transitory computer-readable medium, excluding transitory signal transmission, of claim 17, wherein the determining of the second matrix comprises:
    transforming the second matrix into a third matrix using a locality sensitive hashing process applied to the first matrix.

* * * * *